US010787202B2

(12) United States Patent
Kondo et al.

(10) Patent No.: US 10,787,202 B2
(45) Date of Patent: Sep. 29, 2020

(54) VEHICLE CHASSIS FRONT SECTION STRUCTURE

(71) Applicant: HONDA MOTOR CO., LTD., Tokyo (JP)

(72) Inventors: Takehiro Kondo, Wako (JP); Tomohito Kamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 124 days.

(21) Appl. No.: 16/319,028

(22) PCT Filed: May 23, 2017

(86) PCT No.: PCT/JP2017/019218
§ 371 (c)(1),
(2) Date: Jan. 18, 2019

(87) PCT Pub. No.: WO2018/016174
PCT Pub. Date: Jan. 25, 2018

(65) Prior Publication Data
US 2019/0283809 A1    Sep. 19, 2019

(30) Foreign Application Priority Data
Jul. 21, 2016  (JP) ................. 2016-143762

(51) Int. Cl.
 *B62D 21/15* (2006.01)
 *B62D 25/08* (2006.01)
(52) U.S. Cl.
 CPC .......... *B62D 21/152* (2013.01); *B62D 21/15* (2013.01); *B62D 21/157* (2013.01); *B62D 25/08* (2013.01)
(58) Field of Classification Search
 CPC ...... B62D 21/15; B62D 21/152; B62D 25/08; B62D 25/082; B62D 25/085
 (Continued)

(56) References Cited

U.S. PATENT DOCUMENTS

| | | | |
|---|---|---|---|
| 9,855,971 B2 * | 1/2018 | Daido ..................... | B60R 19/34 |
| 2005/0077711 A1 * | 4/2005 | Yasui ..................... | B62D 25/04 |
| | | | 280/735 |

(Continued)

FOREIGN PATENT DOCUMENTS

| | | |
|---|---|---|
| JP | H04-063776 A | 2/1992 |
| JP | H05-024558 A | 2/1993 |

(Continued)

OTHER PUBLICATIONS

International Search Report by ISA/JP dated Jul. 11, 2017, on PCT/JP2017/019218 (5 pages).

(Continued)

*Primary Examiner* — Jason S Daniels
(74) *Attorney, Agent, or Firm* — Rankin, Hill & Clark LLP

(57) ABSTRACT

A lateral-section frame is positioned to the outside of a front side frame in the vehicle widthwise direction, and is equipped with a wheel housing upper member, the rear end of which is connected to a front pillar, and a wheel housing lower member which extends from the wheel housing upper member via an upper curved section and a lower curved section in a manner such that the front end thereof extends forward and downward to a substantially identical location in the vertical direction and front-rear direction as does the front end of the front side frame. The wheel housing lower member is equipped with an outer panel and an inner panel which are joined by upper flange sections and lower flange sections, and the upper flange sections in the front section of the wheel housing lower member are configured from upward-facing flanges that extend upward.

8 Claims, 9 Drawing Sheets

(58) Field of Classification Search
USPC .......................... 296/187.09, 193.09, 203.02
See application file for complete search history.

(56) References Cited

U.S. PATENT DOCUMENTS

| | | | |
|---|---|---|---|
| 2015/0069785 A1* | 3/2015 | Sakakibara | B62D 25/085 296/187.1 |
| 2015/0151792 A1* | 6/2015 | Mori | F16F 7/12 296/187.09 |
| 2016/0039373 A1* | 2/2016 | Yamada | B60R 19/12 293/132 |

FOREIGN PATENT DOCUMENTS

| | | |
|---|---|---|
| JP | H06-135355 A | 5/1994 |
| JP | H07-025352 A | 1/1995 |
| JP | H09-207816 A | 8/1997 |
| JP | 2005-112173 A | 4/2005 |
| JP | 2005-350015 A | 12/2005 |
| JP | 2008-201289 A | 9/2008 |
| JP | 2008-213723 A | 9/2008 |
| JP | 2009-023385 A | 2/2009 |
| JP | 2016-052804 A | 4/2016 |

OTHER PUBLICATIONS

Written Opinion by ISA/JP dated Jul. 11, 2017, on PCT/JP2017/019218 (5 pages).

* cited by examiner

VEHICLE CHASSIS FRONT SECTION STRUCTURE

TECHNICAL FIELD

The present invention relates to a vehicle chassis front section structure of an automobile or the like.

BACKGROUND ART

It is common practice that a wheel housing lower member is set to have a section having a relatively low strength in advance so as to absorb collision energy in case of a front collision of a vehicle by bringing this section to buckling. In general, a wheel housing lower member is provided with an upper curved section and a lower curved section and formed into a shape that extends in a vehicle longitudinal direction. Here, the upper curved section and the lower curved section are used collectively as a buckling section.

In a typical structure, each of a wheel housing lower member and a wheel housing upper member to be disposed behind the wheel housing lower member generally includes an inner panel located on the inside in a vehicle widthwise direction and an outer panel located on the outside in the vehicle widthwise direction, and an upper flange section of each outer panel and a lower flange section of the corresponding outer panel are flange-coupled to each other. In this structure, the wheel housing lower member and the wheel housing upper member are disposed in a limited space below an engine hood. For this reason, each upper flange section faces a problem of a constraint on its shape so as not to interfere with other peripheral components.

Patent Literature 1 to 3 describes examples of related art to a flange structure around the wheel housing lower member. Patent Literature 1 describes a technique in which a reinforcement member for suppressing inward falls is provided on the inside in the vehicle widthwise direction of a front side upper extension frame, where a flange extending downward is provided to a front upper side frame while a flange extending upward is provided to the front side upper extension frame. Patent Literature 2 describes a technique for increasing and decreasing the number of bent sections in a cross-sectional shape either by displacing a position of a flange in a widthwise direction of the frame depending on the position in the longitudinal direction of the frame or by changing the cross-sectional shape depending on the position in the longitudinal direction of the frame, which also describes the flange that extends upward. Patent Literature 3 describes a technique for providing a reinforcement panel in a region surrounded by a strut tower, a hood ridge panel, and a front side vertical wall section of a cowl top panel, in which a horizontal flange is formed in front of the hood ridge panel and a flange that extends upward is formed behind the hood ridge panel.

CITATION LIST

Patent Literature

Patent Literature 1: Japanese Patent Application Publication No. Hei 4-63776
Patent Literature 2: Japanese Patent Application Publication No. Hei 6-135355
Patent Literature 3: Japanese Patent Application Publication No. Hei 7-25352

SUMMARY OF INVENTION

Technical Problem

A front peripheral part of the wheel housing lower member is located at a position where clearances with peripheral components such as a headlight can be easily secured. Accordingly, a shape of the flange at each flange section is relatively less constrained.

An object of the present invention is to provide a vehicle chassis front section structure which enables stable buckling deformation of a lateral-section frame in case of a vehicle collision by optimizing shapes of flange sections thereof.

Means to Solve the Problem

To solve the problems, a vehicle chassis front section structure includes: a lateral-section frame disposed on outside in a vehicle widthwise direction of a front side frame, the lateral-section frame including a wheel housing upper member with a rear end connected to a front pillar, and a wheel housing lower member extending forward and downward from the wheel housing upper member via an upper curved section and a lower curved section of the wheel housing lower member with a front end of the wheel housing lower member located substantially at the same position in terms of a vertical direction and a longitudinal direction as a front end of the front side frame, wherein each of the wheel housing upper member and the wheel housing lower member includes an outer panel and an inner panel to be joined to each other by using upper flange sections and lower flange sections provided to the panels, respectively, such that the wheel housing upper and lower members define a continuous hollow cross-section, and each upper flange section at a front part of the wheel housing lower member is formed from an upward flange that extends upward. A stiffener that extends forward and rearward across the upper curved section is attached to interior of the wheel housing lower member, and a fragile section is formed on an inside ridge of the upper curved section and configured to induce deformation of the upper curved section in case of input of a collision load. A fragile section is formed on an inside ridge of the lower curved section of the wheel housing lower member and configured to induce deformation of the lower curved section in case of input of a collision load.

In accordance with the aforementioned vehicle chassis front section structure the front part of the wheel housing lower member is located at such positions that can easily secure clearances with surrounding components including a headlight and the like. Accordingly, the upper flange sections in this zone can be formed into the upward flanges that extend upward. In this way, it is possible to ensure a large section modulus and to increase the amount of impact energy absorption for the bend of the wheel housing lower member caused by the front collision.

In accordance with the aforementioned vehicle chassis front section structure, the wheel housing lower member can be stably bent, at the upper curved section with the fragile section being a bent point while securing the rigidity of the upper-curved section with the stiffener.

In accordance with the aforementioned vehicle chassis front section structure, the wheel housing lower member can be stably bent at the lower curved section with the fragile section being a bent point.

In the aforementioned vehicle chassis front section structure, a portion at rear of the upper curved section of the wheel housing lower member is located lateral to a damper base, and each upper flange section of the portion at the rear of the upper curved section of the wheel housing lower member is formed from a lateral flange that extends horizontally.

In the aforementioned vehicle chassis front section structure an engine hood is disposed above the upper bent section of the wheel housing lower member. Accordingly, it is possible to secure a clearance between a lower surface of the engine hood and the upper flange section by forming the upper flange sections into the lateral flanges. As a consequence, it is possible to secure a concave margin when the engine food causes a downward concave deformation due to external force from an obstacle or the like. An excessive deformation of the upper horizontal straight section in case of the front, collision can be suppressed by joining the lateral flanges to the upper surface of the damper base.

In the aforementioned vehicle chassis front section structure, each upper flange section of the wheel housing upper member is formed from an upward flange that extends upward, and the upward flanges of the upper flange sections of the wheel housing upper member are offset outward in the vehicle width direction from the upward flange of the upper flange sections at the front part of the wheel housing lower member, and is bent such that a front part of the upward flanges of the upper flange sections of the wheel housing upper member is displaced inward in the vehicle widthwise direction relative to a rear part of the upper flanges of the upper flange sections of the wheel housing upper member.

In the aforementioned vehicle chassis front section structure, the upper flange sections are formed into the upward flanges. Thus, the wheel housing upper member is stably bent in the vehicle widthwise direction behind the damper base without being blocked to exert the impact energy absorption function.

In accordance with the aforementioned vehicle chassis front section structure, it is possible to stably bend a front part of the wheel house upper member toward a vehicle inner, side with the curved section being a bent point in response to an input of front collision load.

In the aforementioned vehicle chassis front section structure, each lower flange section of each of the wheel housing upper member and the wheel housing lower member is formed from a lateral flange that extends horizontally.

In accordance with the aforementioned vehicle chassis front section structure, even when the orientation on the upper flange section side varies in terms of the longitudinal direction, the outer panel can be easily lapped over and attached to the inner panel from the outside in the vehicle widthwise direction, and a hollow cross-sectional portion can be defined continuously inside the lateral-section frame.

In the aforementioned vehicle chassis front section structure, a front end of the lateral-section frame and the front end of the front side frame are connected to each other by using a gusset, and a front part of the lateral-section frame is bent substantially into a Z-shape while using the upper curved section and the lower curved section as bending points and a front part of the front side frame is bent inward in the vehicle widthwise direction substantially into a V-shape in response to a front collision load.

In accordance with the aforementioned vehicle chassis front section structure, it is possible to create a deformation behavior of the front part of the lateral-section frame that is bent into the Z-shape in the vertical direction and a deformation behavior of the front part of the front side frame that is bent inward in the vehicle widthwise direction into the V-shape without causing interference with each other. Thus, the amount of impact energy absorption can be secured.

Advantage of the Present Invention

In accordance with the present invention, it is possible to stably bend a side frame in case of a vehicle collision by optimizing a shape of the flange section.

DESCRIPTION OF EMBODIMENTS

Figure 1:
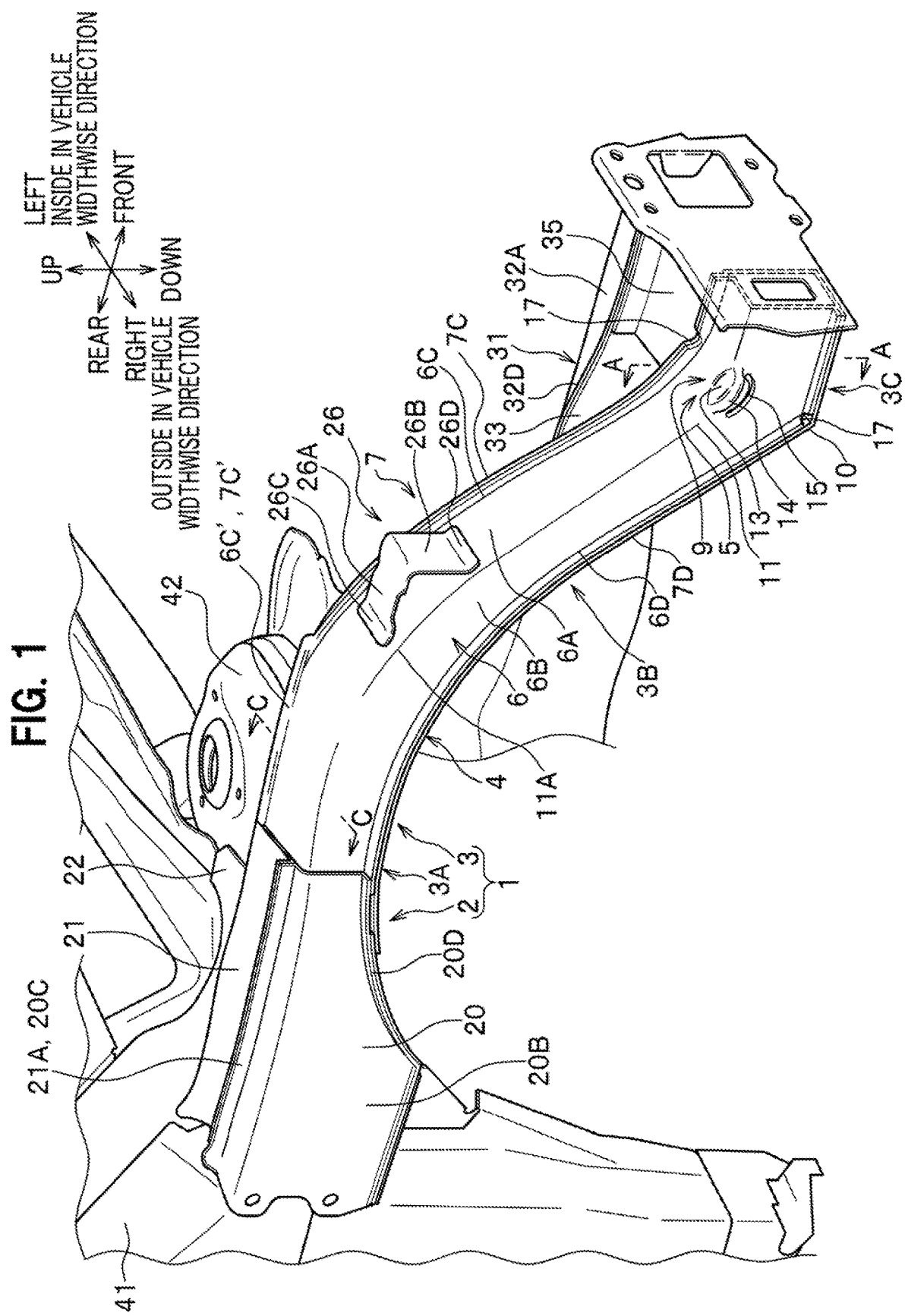
FIG. 1 is a perspective view of a vehicle chassis front section structure according to an embodiment.
Figure 2:
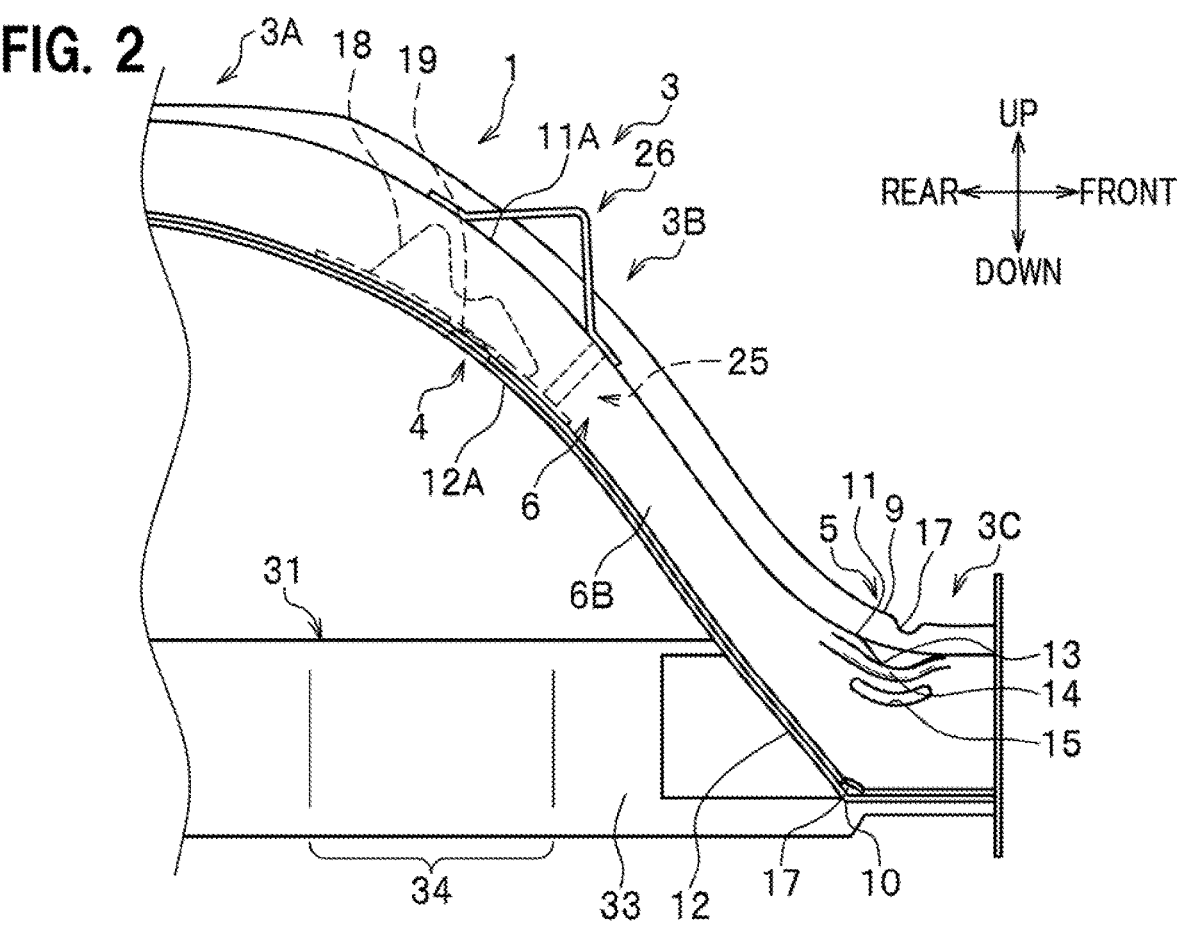
FIG. 2 is a side view of the vehicle chassis front section structure according to the embodiment.
Figure 3:
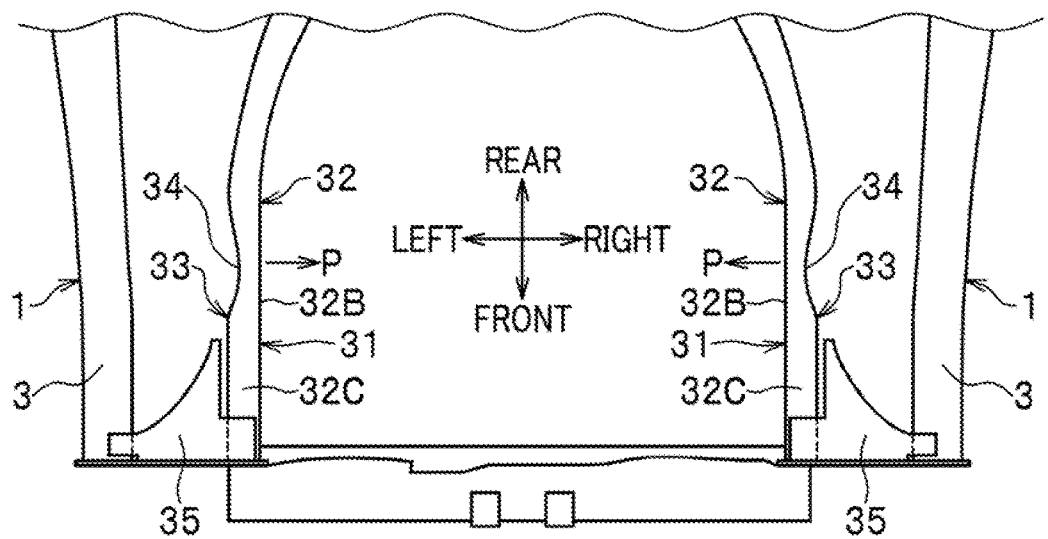
FIG. 3 is a bottom view of the vehicle chassis front, section structure according to the embodiment.
Figure 4:
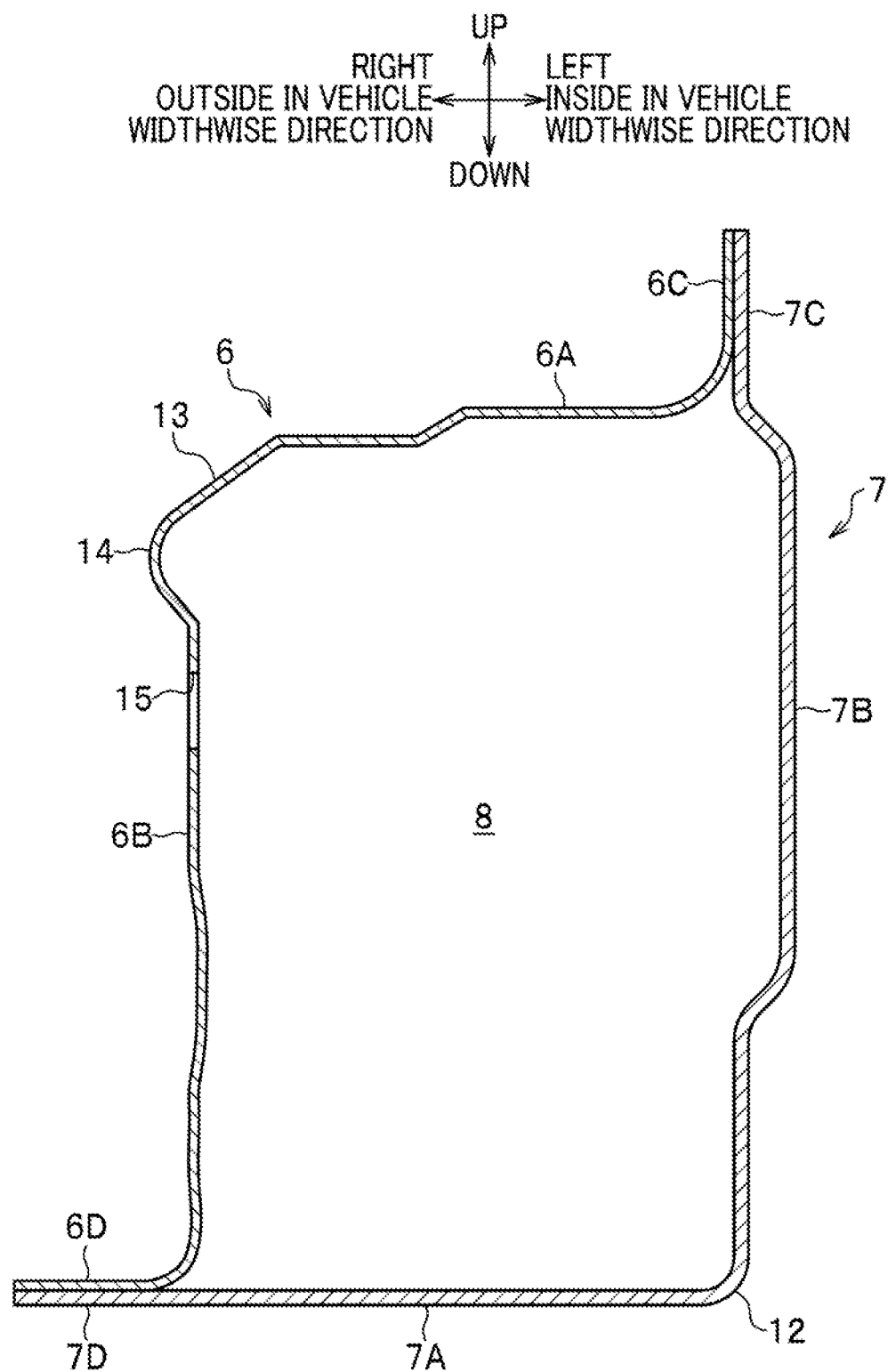
FIG. 4 is a cross-sectional view taken along the A-A line in FIG. 1.
Figure 5:
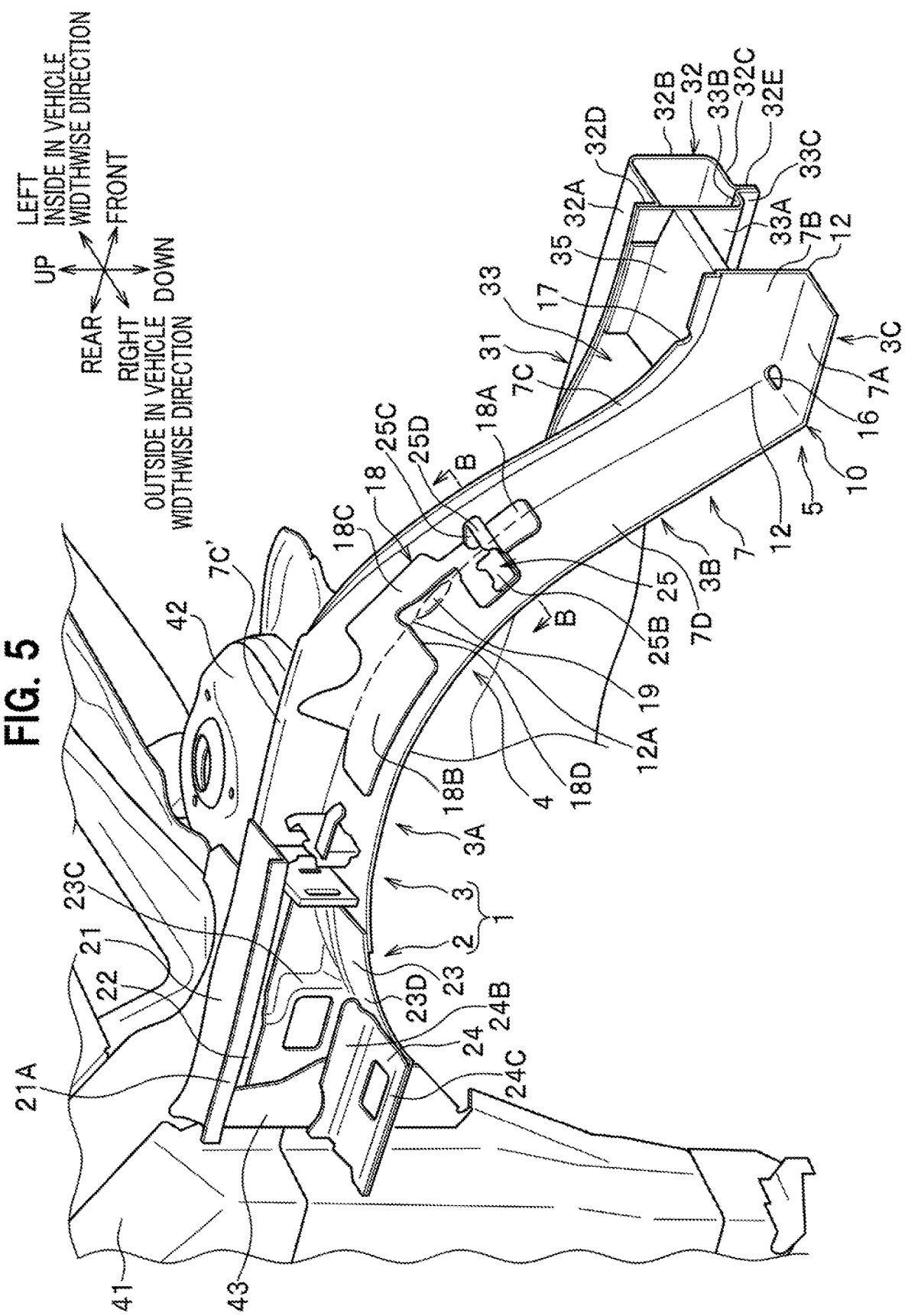
FIG. 5 is a perspective view of the vehicle chassis front section structure in a state of detaching an outer panel of a lateral-section frame.

A description will be given of a mode of applying the present invention to a frame structure of a vehicle chassis front section of an automobile. Referring to FIGS. 1 to 5, lateral-section frames 1 and front side frames 31 are disposed on two sides in a vehicle widthwise direction of a vehicle to form right and left pairs. As shown in FIG. 3, each lateral-section frame 1 is disposed on outside in the vehicle widthwise direction of the corresponding front side frame 31. FIGS. 1, 2, and 5 illustrate the lateral-section frame 1 and the front side frame 31 located on the right side of the vehicle. While the following description will discuss the lateral-section frame 1 and the front side frame 31 disposed on the right side of the vehicle, those on the left side of the vehicle have the same structures except that they are formed into symmetrical shapes to the foregoing.

(Lateral-Section Frame 1)

The lateral-section frame 1 includes: a wheel housing upper member 2 with its rear end being connected to a front pillar 41; and a wheel housing lower member 3 with its front end located at substantially at the same position as a front end of the front side frame 31 in a vertical direction and a vehicle longitudinal direction by extending forward and downward from the wheel housing upper member 2 via an upper curved section 4 and a lower curved section 5. The wheel housing upper member 2 extends in the vehicle longitudinal direction above a wheel housing. A front end of the wheel housing upper member 2 and a rear end of the wheel housing lower member 3 overlap each other and are joined together by spot welding or the like.

(Wheel Housing Lower Member (Curved Frame) 3)

The wheel housing lower member 3 is formed into a shape provided with: an upper horizontal straight section 3A horizontally extending forward by a certain amount from the front end of the wheel housing upper member 2; an inclined straight section 3B extending straight forward and downward from a front end of the upper horizontal straight section 3A via the upper curved section 4; and a lower horizontal straight section 3C horizontally extending forward by a certain amount from a lower end of the inclined straight section 3B via the lower curved section 5. A front end of the lower horizontal straight section 3C is located substantially at the same position as the front end of the front side frame 31 in the vertical direction and the longitudinal direction. A damper base (a damper housing) 42 to cover a not-illustrated damper from above is disposed on inside in a vehicle widthwise direction of the upper horizontal straight section 3A.

Figure 9:
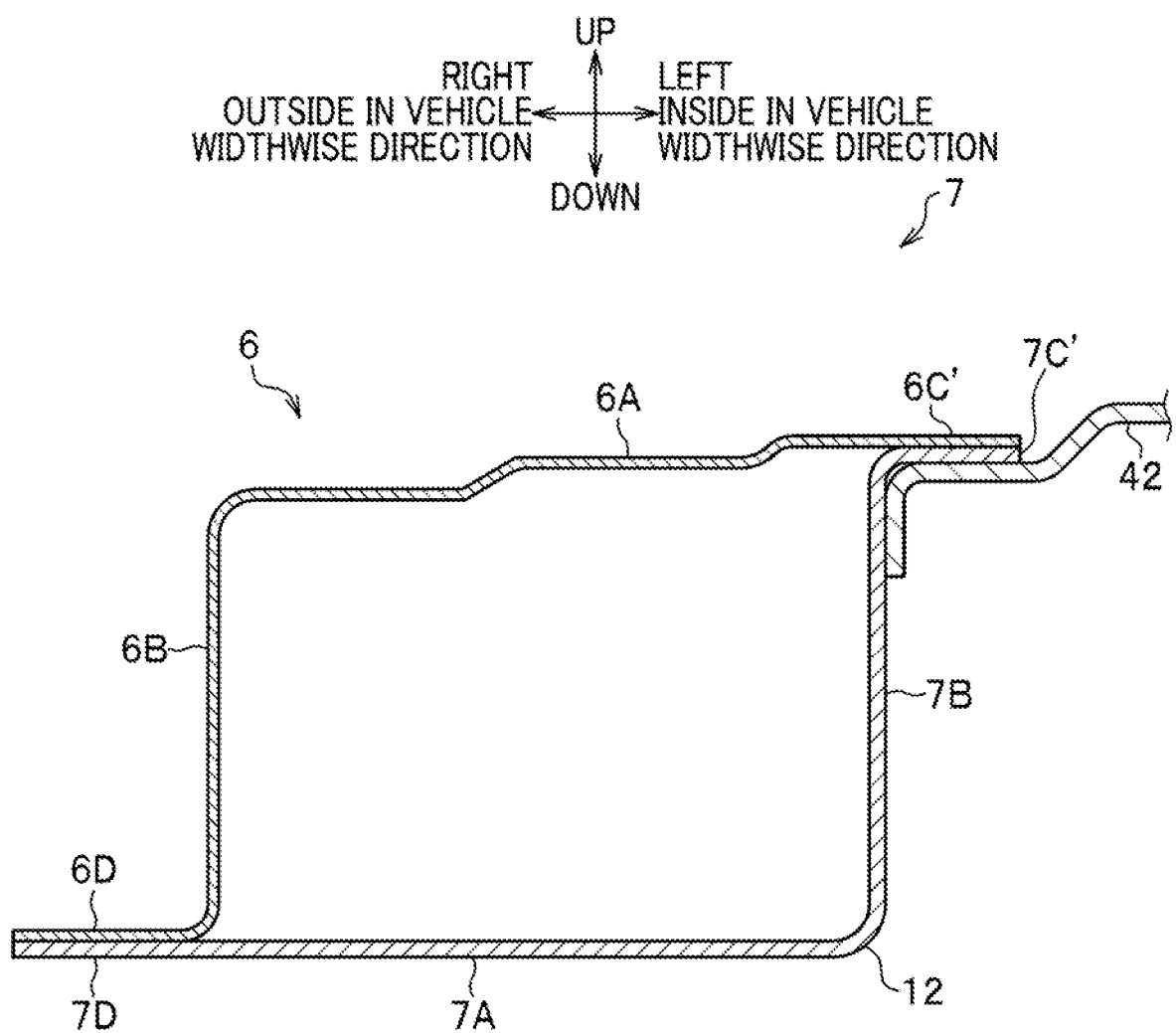
FIG. 9 is a cross-sectional view taken along the C-C line in FIG. 1.

The wheel housing lower member 3 is formed from an outer panel (a first panel) 6 and an inner panel (a second panel) 7. As shown in FIG. 4, the outer panel 6 is a member taking on a substantially L-shaped cross-section, which is formed from: an upper surface section (a first surface) 6A extending almost, horizontally in the vehicle widthwise direction; an outside surface section (a second surface) 6B extending vertically downward from an outside end in the vehicle widthwise direction of the upper surface section 6A; an upper flange section 6C formed from an upward flange extending vertically upward from an inside end in the vehicle widthwise direction of the upper surface section 6A; and a lower flange section 6D formed from a lateral flange extending horizontally outward in the vehicle widthwise direction from a lower end of the outside surface section 6B. The inner panel 7 is also a member taking on a substantially L-shaped cross-section, which is formed from: a lower surface section (a third surface) 7A extending almost, horizontally in the vehicle widthwise direction; an inside surface section (a fourth surface) 7B extending almost vertically upward from an inside end in the vehicle widthwise direction of the lower surface section 7A; an upper flange section 7C formed from an upward flange extending vertically upward from an upper end of the inside surface section 7B; and a lower flange section 7C formed from a lateral flange extending horizontally outward in the vehicle widthwise direction from an outside end in the vehicle widthwise direction of the lower surface section 7a. Nonetheless, portions of the upper flange sections 6C and 7C at the rear of the upper curved section 4, that is, at the upper horizontal straight section 3A are formed from lateral flanges 6C' and 7C', which extend horizontally inward in the vehicle widthwise direction and are joined to an upper surface of the damper base 42 as shown in FIG. 9.

As described above, by joining the upper flange sections 6C and 7C together and the lower flange sections 6D and 7D together by spot welding or the like, respectively, the upper surface section 6A and the lower surface section 7A are vertically opposed to each other while the outside surface section 6B and the inside surface section 7B are laterally opposed to each other, thereby forming a rectangular closed cross-sectional portion 8 being a hollow cross-sectional portion inside the wheel housing lower member 3. FIG. 4 is a diagram viewing a cross-section of the lower curved section 5 in which the rectangular closed cross-sectional portion 8 takes on a vertically long shape. On the other hand, the rectangular closed cross-sectional portion 8 slightly reduces its vertical length at the inclined straight section 3B, the upper curved section 4, and the upper horizontal straight section 3A. As described above, the wheel housing lower member 3 is formed from the outer panel 6 having the substantially L-shaped cross-section that includes the first surface and the second surface collectively forming an inside curved surface and from the inner panel 7 having the substantially L-shaped cross-section that includes the third surface and the fourth surface collectively forming an outside curved surface. Moreover, the wheel housing lower member 3 adopts the structure to overlap and join the flanges at the two ends of one of the panels to the corresponding ends on the two sides of the other panel, respectively. Thus, it is easy to form the panels and productivity of the panels is improved.

At the lower curved section 5, the upper surface section 6A forms an arc-shaped curved surface which is recessed upward while the lower surface section 7A is formed to project downward. Schematically speaking, the center of curvature of the lower curved section 5 is located on the upper side of the upper surface section 6A. Accordingly, the curved surface of the upper surface section 6A is deemed to have an angle of bend (a range of bend) smaller than that of the curved surface of the lower curved section 6B. In the present invention, the curved surface of the upper surface section 6A having the smaller angle of bend will be referred to as an inside curved surface 9 while the curved surface of the lower surface section 7A will be referred to as an outside curved surface 10. In the meantime, a ridge (a corner-line) formed by the upper surface section 6A and the outside surface section 6B will be referred to as an inside ridge 11 while a ridge formed by the lower surface section 7A and the inside surface section 7B will be referred to as an outside ridge 12.

In contrast, at the upper curved section 4, the upper surface section 6A is formed to project upward while the lower surface section 7A is formed as an arc-shaped curved surface which is recessed downward. Accordingly, the lower surface section 7A forms an inside curved surface while the upper surface section 6A forms an outside curved surface. In the upper curved section 4, a ridge formed by the lower surface section 7A and the inside surface section 7B will be referred to as an inside ridge 12A while a ridge formed by the upper surface section 6A and the outside surface section 6B will be referred to as an outside ridge 11A.

A dent 13 to induce the buckling deformation of the lower curved section 5 in case of input of a front collision load is formed on the inside ridge 11 of the lower curved section 5 in such a way as to be recessed toward the inside of the rectangular closed cross-sectional portion 8. The dent 13 is formed over the upper surface section 6A and the outside surface section 6B as a dent almost in an almost oval shape which is elongated substantially in a direction of extension of the wheel housing lower member 3. A bulge 14 is formed at a portion of the outside surface section 6B below the dent 13 in such a way as to bulge outward in the vehicle widthwise direction as shown in FIG. 4. The dent 13 is formed, for example, by pressing the inside ridge 11 downward from the upper surface section 6A. As a consequence, the portion of the outside surface section 6B below the dent 13 is pushed outward in the vehicle widthwise direction to form the bulge 14.

An elongated hole 15 is formed in a penetrating manner along the dent 13 and below the bulge 14 of the outside surface section 6B. A bottom surface of the dent 13 takes on the arc shape that is recessed upward when viewed in the vehicle widthwise direction. Accordingly, the elongated hole 15 also takes on an arc shape that is recessed upward as with the bulge 14. The elongated hole 15 has a function to facilitate a downward deformation of the dent 13.

As shown in FIG. 5, a through-hole 16 is formed in the outside ridge 12 of the inner panel 7 at the lower curved section 5. Here, as apparent from FIGS. 1 and 2, the upper surface section 6A of the inside curved surface 9 is formed into a gentle arc shape from the lower horizontal straight section 3C to the inclined straight section 3B. Meanwhile, the lower surface section 7A (FIG. 4) of the lower curved surface 10 is formed in such a way as to intersect a range from the lower horizontal straight section 3C to the inclined straight section 3B while substantially retaining a flat shape. As shown in FIG. 5, the through-hole 16 is formed at a corner section surrounded by three surfaces of the lower surface section 7A of the lower horizontal straight section 3C and the lower surface section 7A as well as the inside surface section 7B of the inclined straight section 3B, and from the lower surface section 7A and the inside surface section 7B of the lower horizontal straight section 3C across the outside ridge 12. The through-hole 16 formed on the outside ridge 12 side induces the buckling deformation of the lower curved section 5 in cooperation with the dent 13 formed on the inside ridge 11 side.

At the lower curved section 5, substantially semicircular notches 17 are formed on the upper flange section 6C and the lower flange section 6D of the outer panel 6 and on the upper flange section 7C of the inner panel 7, respectively. The respective notches 17 on the upper flange section 6C and the upper flange section 7C are located at such positions overlapping each other when viewed in the vehicle widthwise direction. These notches 17 also induce the buckling deformation of the lower curved section 5.

(Stiffener (Reinforcement Member) 18)

As shown in FIG. 5, a stiffener 18 serving as a reinforcement member, which extends forward and rearward (in the direction of extension of the wheel housing lower member 3) across the upper curved section 4, is attached to the interior of the wheel housing lower member 3 by spot welding or the like. The stiffener 18 is attached around the inside ridge 12A of the inner panel 7, that is, attached to the lower surface section 7A and the inside surface section 7B across the inside ridge 12A. Cutouts and the like are formed on the periphery of the stiffener 18 such that the stiffener 18 does not interfere with various ribs, holes, and the like provided to the inner panel 7. Nonetheless, the stiffener 18 takes on a shape of a substantially L-shaped cross-section which is bent almost at a right angle and extends substantially from the lower surface section 7A and the inside surface section 7B. To be more precise, the stiffener 18 includes: a front rigid section 18A and a rear rigid section 18B which are attached to the lower surface section 7A and the inside surface section 75 across the inside ridge 12A; and a connecting section 18C which is attached to at least the Inside surface section 7B and connects the front rigid section 18A and the rear rigid section 18B to each other.

A recess 19 to induce buckling deformation of the upper curved section 4 in case of the input of the front collision load is formed on the inside ridge 12A of the upper curved section 4. As with the dent 13 on the lower curved section 5, the recess 19 is a dent formed in such a way as to be recessed toward the inside of the rectangular closed cross-sectional portion 8. The stiffener 18 is provided with a cutout 18D to avoid interference with the recess 19 which will project into the rectangular closed cross-sectional portion 8. The cutout 18D is formed substantially into a rectangular shape from an edge section of the stiffener 18 attached to the lower surface section 7A side to the inside surface section 7B in such a way as to bypass the recess 19. In other words, the stiffener 18 is disposed around the recess 19 such that the cutout 18D defines a clearance hole for the recess 19. The cutout 18A also has a function as a fragile section that induces the buckling deformation of the upper curved section 4.

Here, a hole to avoid contact with the recess 19 may be formed in the stiffener 18 in place of the cutout 18D. In this case, the connecting section 18C will be attached to both the inside surface section 7B and the lower surface section 7A. Alternatively, the stiffener 18 may be formed into a member having a substantially U-shaped cross-section to be attached to the lower surface section 7A, the inside surface section 7B, and the outside surface section 6B.

(Bulkhead (Dividing Wall Member) 25)

Figure 6:
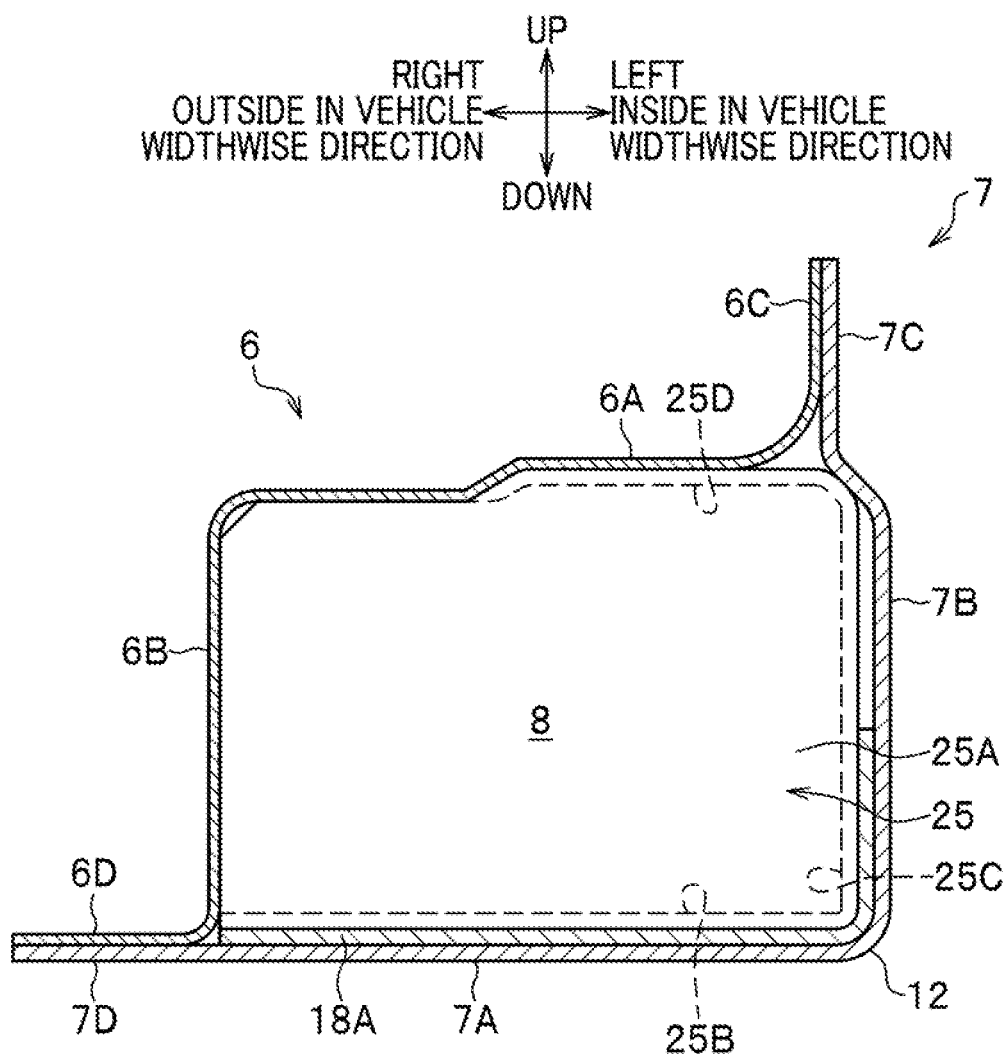
FIG. 6 is a cross-sectional view taken along the B-B line in FIG. 5.

A bulkhead 25 for reinforcement to divide the rectangular closed cross-sectional portion 8 in the wheel housing lower member 3 in the direction of extension of the wheel housing lower member 3 is attached to the front rigid section 18A of the stiffener 13. In FIGS. 5 and 6, the bulkhead 25 includes: a bulkhead plate section 25A shaped in accordance with the rectangular closed cross-sectional portion 8; a lower flange section 25B attached to the front rigid section 18A on the lower surface section 7A side by spot welding or the like; a lateral flange section 25C attached to the front rigid section 18A on the inside surface section 7B side by spot welding or the like; and an upper flange section 25D fitted to the upper surface section 6A of the outer panel 6.

(Fender Support Bracket 26)

A fender support bracket 26 to support a not-illustrated front fender of the vehicle chassis is disposed on the upper surface section 6A of the outer panel 6 above the bulkhead 25. The fender support bracket 26 includes: a horizontal surface section 26A which is substantially horizontal; a vertical surface section 26B extending vertically downward from a front end of the horizontal, surface section 26A; an upper flange section 260 formed at a rear end of the horizontal surface section 26A; and a lower flange section 26D formed at a lower end of the vertical surface section 26B. The upper flange section 26C and the lower flange section 26D are joined to the upper surface section 6A by spot welding or the like. The upper flange section 25D of the bulkhead 25 is located substantially below the lower flange section 26D.

(Wheel Housing Upper Member 2)

Figure 7:
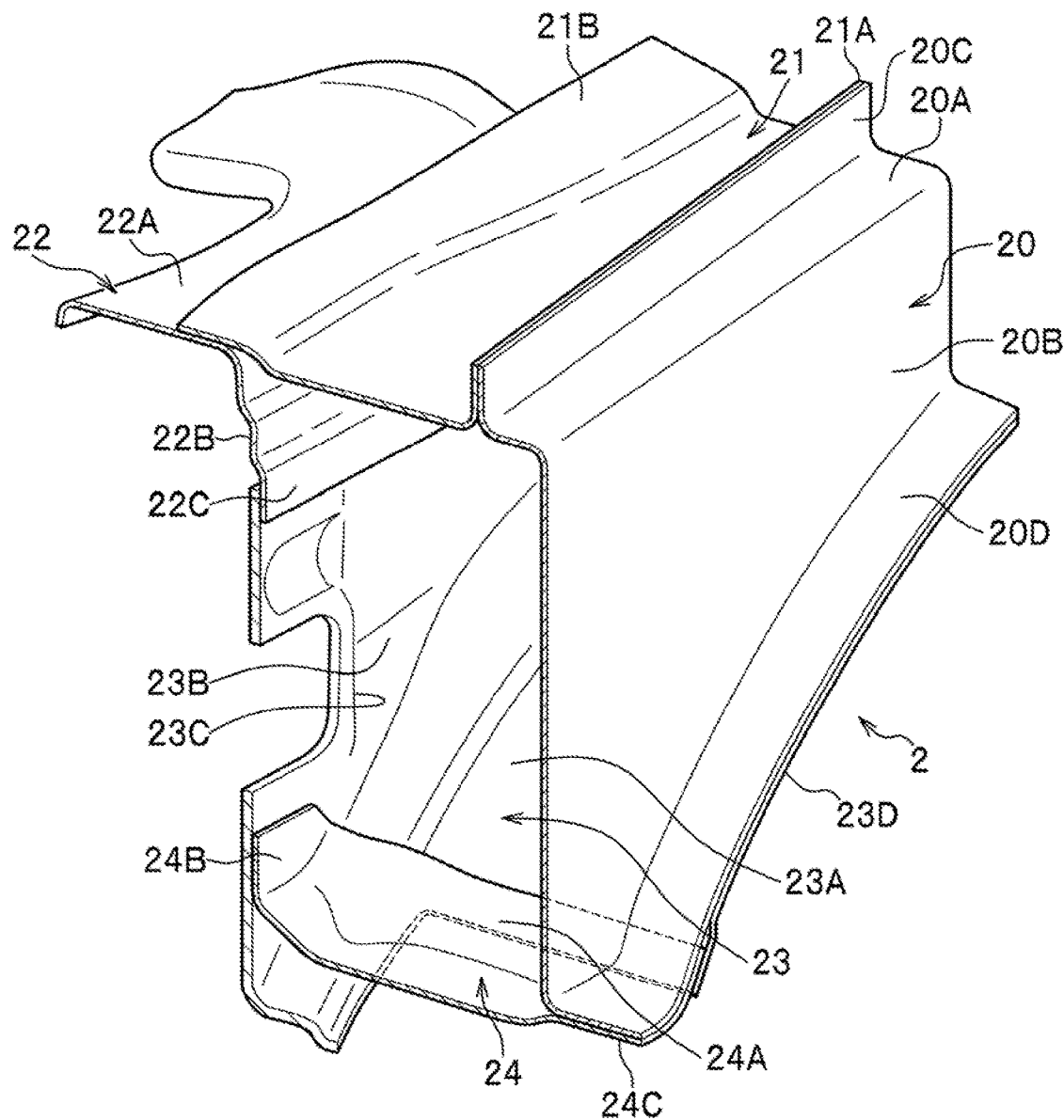
FIG. 7 is a cross-sectional perspective view of a wheel housing upper member.

The wheel housing upper member 2 is located substantially behind the damper base 42. Referring to FIGS. 1, 5, and 7, the wheel housing upper member 2 includes: an outer panel 20 located on the outside in the vehicle widthwise direction; and a first inner panel 21, a second inner panel 22, a third inner panel 23, and a fourth inner panel 24 which are located on the inside in the vehicle width direction. As shown in FIG. 7, the outer panel 20 is formed from an upper surface section 20A extending horizontally in the vehicle longitudinal direction, and an outside surface section 20B extending vertically downward from an outside end in the vehicle widthwise direction of the upper surface section 20A. The upper surface section 20A is provided with an upper flange section 20C formed from an upward flange extending vertically upward from an inside end in the vehicle widthwise direction thereof, and the outside surface section 20B is provided with a lower flange section 20D formed from a lateral flange extending horizontally outward in the vehicle widthwise direction from a lower end thereof.

The first inner panel 21 extends horizontally in the vehicle longitudinal direction at the same position in height as the upper surface section 20A of the outer panel 20. An outside end in the vehicle widthwise direction of the first inner panel 21 is provided with an upper flange section 21A formed from an upward flange extending upward and being joined to the upper flange section 20C of the outer panel 20, while an inside end in the vehicle widthwise direction thereof is provided with an inner flange section 21B formed from a lateral flange being placed on and joined to an upper surface section 22A of the second inner panel 22 and the damper base 42 (FIG. 5). The second inner panel 22 includes the upper surface section 22A that extends substantially horizontally and an inside surface section 22B that extends downward from an outside end in the vehicle widthwise direction of the upper surface section 22A, thus taking on a substantially L-shaped cross-section. A lower end of the inside surface section 22B is provided with a flange section 22C that extends downward.

The third inner panel 23 includes an arc-shaped lower surface section 23A that is displaced downward to the rear of the vehicle and an inside surface section 23B that extends upward from an inside end in the vehicle widthwise direction of the lower surface section 23A, thus taking on a substantially L-shaped cross-section. A rear end of the inside surface section 23B is joined to a lateral extension section 43 (FIG. 5) of a dash lower panel. An outside end in the vehicle widthwise direction of the lower surface section 23A is provided with a lower flange section 23D formed from a lateral flange that is joined to the lower flange section 20D of the outer panel 20, while an upper end of the inside surface section 23B is provided with an upward flange that is joined to the flange section 22C of the second inner panel 22. The inside surface section 23B is provided with a stepped section 230 which is stepped in the vehicle widthwise direction. The stepped section 230 constitutes a bend starting point of the buckling deformation in case of the input of the front collision load. The fourth inner panel 24 extends horizontally. A front end and an inside end in the vehicle widthwise direction of the fourth inner panel 24 are provided with a front flange section 24A and an inside flange section 24B which are joined to the lower surface section 23A and the inside surface section 23B of the third inner panel 23 and the lateral extension section 43 of the dash lower panel, respectively. Meanwhile, an outside end in the vehicle width direction of the fourth inner panel 24 is provided with a lower flange section 24C formed from a lateral flange that is joined to the lower flange section 20D of the outer panel 20.

As described above, of the wheel housing upper member 2, an upper surface is formed from the upper surface section 20A of the outer panel 20 and from the first inner panel 21, an outside surface is formed from the outside surface section 20B of the outer panel 20, an inside surface is formed from the inside surface section 22B of the second inner panel 22 and from the inside surface section 23B of the third inner panel 23, and a lower surface is formed from the lower surface section 23A of the third inner panel 23 and from the fourth inner panel 24, whereby a rectangular closed cross-sectional portion is defined inside. A difference in strength between the outside and the inside in the vehicle widthwise direction in a cross-sectional frame of the wheel housing upper member 2 can be easily provided by forming the outer panel 20 from a high-strength steel plate while forming the respective inner panels 21 to 24 from steel plates with a lower strength than the outer panel 20. Accordingly, it is possible to bring the wheel housing upper member 2 into the buckling deformation that originates from the stepped section 23C being the fragile section located on the inside in the vehicle widthwise direction in such a way as to be bent stably inward in the vehicle widthwise direction. Thus, collision energy can be absorbed efficiently.

Figure 8:
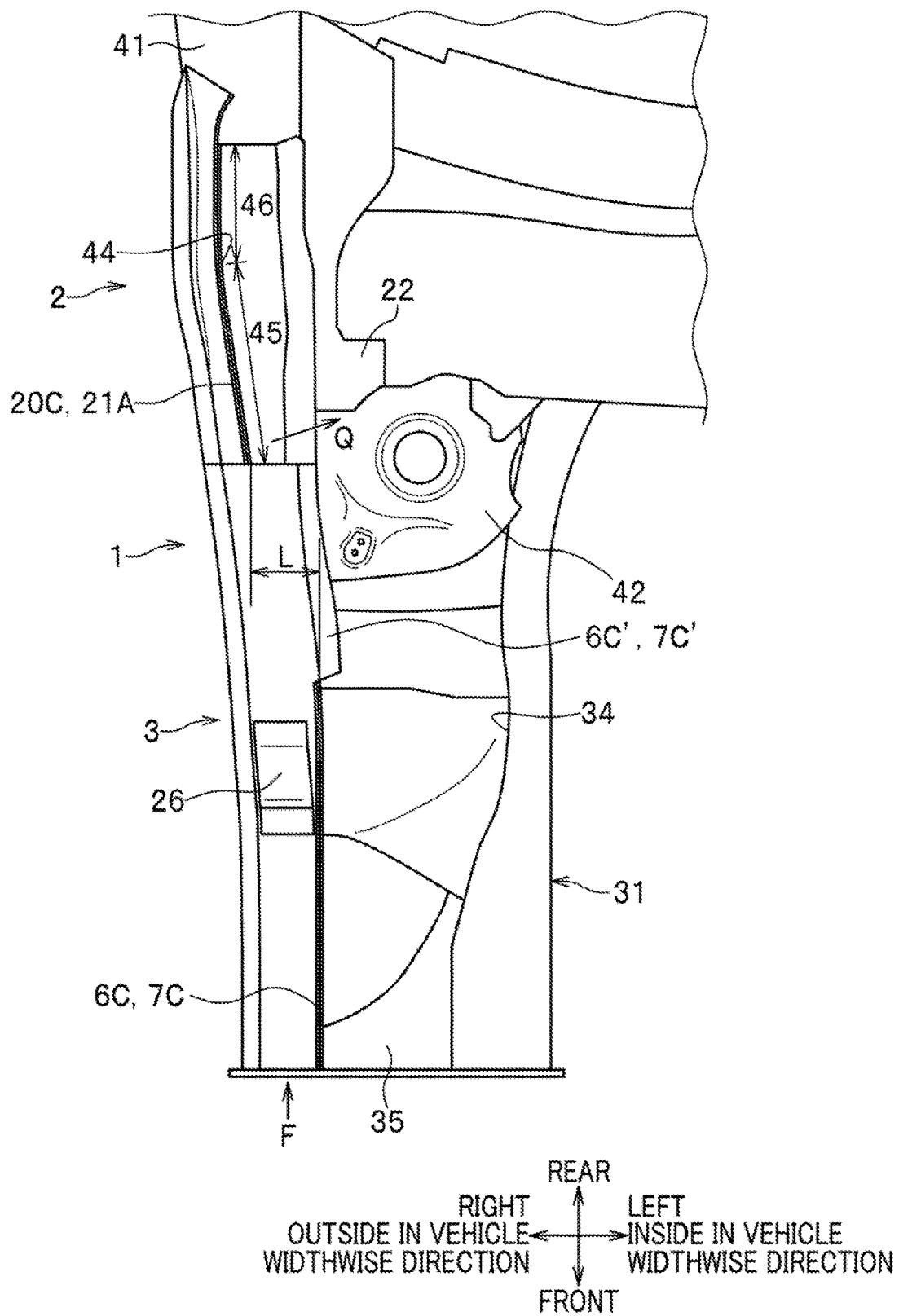
FIG. 8 is a plan view of the vehicle chassis front section structure according to the embodiment.

As shown in FIG. 8, the upward flanges of the upper flange sections 20C and 21A of the wheel housing upper member 2 are offset outward in the vehicle width direction by a distance L or more from the upward flanges of the upper flange sections 6C and 7C at a front part of the wheel housing lower member 3. Moreover, the upward flanges of the upper flange sections 20C and 21A are bent such that a front part 45 thereof is displaced inward in the vehicle widthwise direction relative to a rear part 46 thereof. Specifically, the upward flanges of the upper flange sections 20C and 21A have a bent part 44. Of the upward flanges of the upper flange sections 20C and 21A, the rear part 46 bordered by the bent part 44 extends in a longitudinal direction while the front part 45 extends in such way as to be displaced inward in the vehicle width direction to the front. The bent part 44 is formed substantially at the same position as the stepped section 23C in the longitudinal direction.

(Front Side Frame 31)

In FIGS. 1 to 3 and 5, the front side frame 31 extends in the vehicle longitudinal direction and includes a front side inner panel 32 and a front side outer panel 33. In FIG. 5, the front side inner panel 32 includes a horizontal upper surface section 32A, an inside surface section 32B that extends vertically downward from an inside end in the vehicle widthwise direction of the upper surface section 32A, and a lower surface section 32C that extends outward in the vehicle widthwise direction from a lower end of the inside surface section 32B, thus taking on a substantially U-shaped cross-section of which an outside in the vehicle widthwise direction is open. The upper surface section 32A is provided with an upper flange section 32D formed from an upward flange that extends upward, while the lower surface section 32C is provided with a lower flange section 32E formed from a downward flange that extends downward. The front side outer panel 33 includes an outside surface section 33A that extends vertically, a lower surface section 33B that extends inward in the vehicle widthwise direction from a lower end of the outside surface section 33A, and a lower flange section 33C formed from a downward flange that extends downward from the lower surface section 33B. Accordingly, the upper flange section 32D and an upper end of the front side outer panel 33 are flange-coupled to each other while the lower flange section 32E and the lower flange section 33C are flange-coupled to each other, whereby a rectangular closed cross-sectional portion is defined inside the front side frame 31.

As shown in FIG. 3, the front side frame 31 is provided with reduced-width sections 34 which induce the buckling deformation of the front side frame 31 in such a way as to be bent inward in the vehicle widthwise direction in case of the input of the front collision load. Each reduced-width section 34 is formed such that the inside surface section 32B of the front side inner panel 32 extends substantially straight along the vehicle longitudinal direction while the front side outer panel 33 is formed to be recessed inward in the vehicle widthwise direction into an arc shape in plan view. Thus, the reduced-width section 34 is formed so as to locally reduce a width dimension in the vehicle widthwise direction of the front side frame 31.

A front end of the wheel housing lower member 3 and a front end of the front side frame 31 are connected to each other by using a gusset 35. The wheel housing lower member 3, the front side frame 31, and the gusset 35 are joined to one another by spot welding or by using bolts and the like. An explanation of a specific shape of the gusset 35 would digress from the scope of the present invention and will therefore be omitted.

(Operations)

Figure 10A:
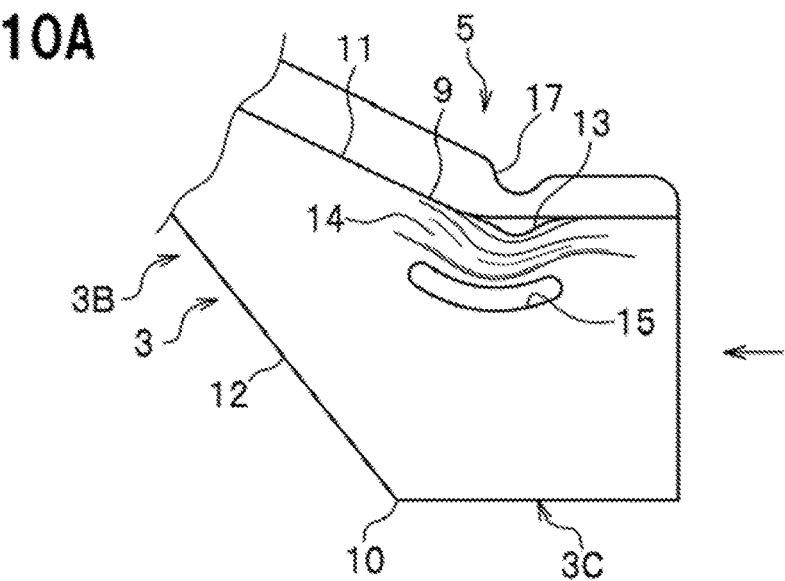
FIGS. 10A to 10C illustrate operational side views of a dent and an elongated hole.
Figure 10B:
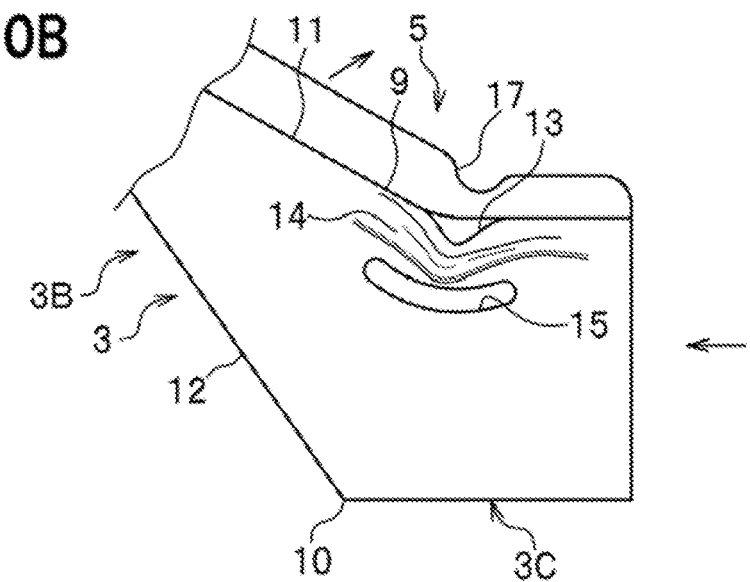
Figure 10C:
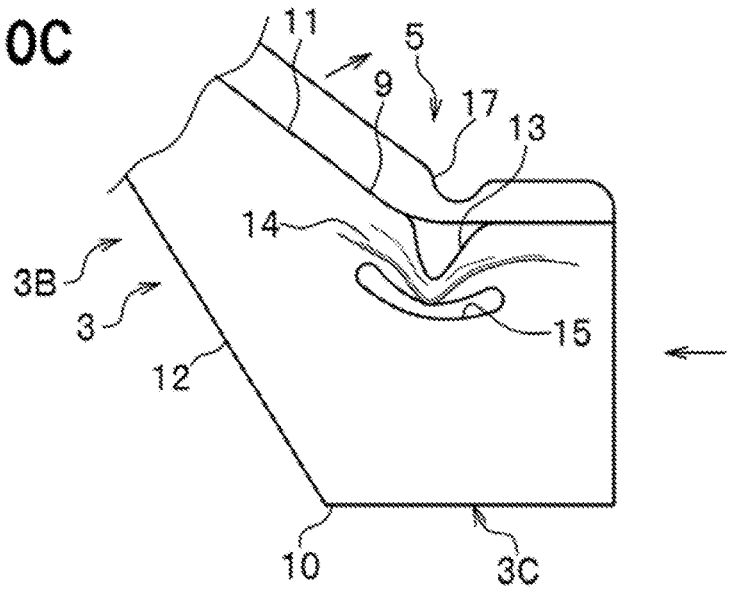

When the front collision load toward the rear is inputted to the front end of the wheel housing lower member 3 of the lateral-section frame 1, the dent 13 at the lower curved section 5 is displaced downward as seen in a sequence FIG. 10A→FIG. 10B→FIG. 10C. Thus, a stress is concentrated on the inside ridge 11, whereby the wheel housing lower member 3 is bent and causes the buckling deformation such that the inclined straight section 3B stands up forward. Since the elongated hole 15 is formed along the dent 13 in the outside surface section 6B below the dent 13, the dent 13 is easily displaced in such a way as to penetrate into a void space in the elongated hole 15. Thus, the lower curved section 5 of the wheel housing lower member 3 is reliably bent at a predetermined value of the collision load and an amount of impact energy absorption is increased.

Meanwhile, since the bulge 14 is provided between the dent 13 and the elongated hole 15, the bulge 14 is easily deflected so as to facilitate the displacement of the dent 13 toward the elongated hole 15. Since the through-hole 16 is formed in the outside ridge 12 of the lower curved section 5, the outside curved surface 10 side of the lower curved section 5 is bent easily. Moreover, the formation of the notches 17 on the upper flange section 6C, the lower flange section 6D, and the upper flange section 7C also facilitates the bending of the lower curved section 5.

Moreover, in case of a narrow offset collision (which is also called a small overlap collision or a fine lap collision), a rotational moment generated by the bend of the lower curved section 5 acts on the upper curved section 4, whereby the wheel housing lower member 3 surely causes a so-called Z-shaped bend in which the inclined straight section 3B is deformed upright by using the lower curved section 5 and the upper curved section 4 as bending points.

Next, operations of the respective flange sections will be described. The inclined straight section 3B and the lower horizontal straight section 3C of the wheel housing lower member 3 are located at such positions that can easily secure clearances with surrounding components including a headlight and the like. Accordingly, the upper flange sections 7C and 7C in this zone can be formed into the upward flanges that extend upward. In this way, it is possible to ensure a large section modulus and to increase the amount of impact energy absorption for the Z-shaped bend of the wheel housing lower member 3 caused by the narrow offset collision.

On the other hand, a not-illustrated engine hood is disposed above the upper horizontal straight section 3A of the wheel housing lower member 3. Accordingly, it is possible to secure a clearance between a lower surface of the engine hood and the upper flange section 6C by forming the upper flange sections 6C and 7C into the lateral flanges 6C' and 7C'. As a consequence, it is possible to secure a concave margin when the engine food causes a downward concave deformation due to external force from an obstacle or the like. An excessive deformation of the upper horizontal straight section 3A in case of the front collision can be suppressed by joining the lateral flanges 6C' and 7C' to the upper surface of the damper base 42.

In the wheel housing upper member 2, the upper flange sections 20C and 21A are formed into the upward flanges. As a consequence, the wheel housing upper member 2 is stably bent in the vehicle widthwise direction behind the damper base 42 without being blocked to exert the impact energy absorption function. In particular, the upward flanges of the upper flange sections 20C and 21A of the wheel housing upper member 2 are offset outward in the vehicle width direction by the distance L or more from the upward flanges of the upper flange sections 6C and 7C of the wheel housing lower member 3, and are bent at the bent part 44 such that the front part 45 is located inside in the vehicle widthwise direction with respect to the rear part 46. In this way, when a front impact load F is received as shown in FIG. 3, it is possible to bend the front part 45 stably inward (in a direction of an arrow Q) while using the bent part 44 and the stepped section 23C (FIG. 5) as bending points.

Meanwhile, the lower flange sections 20D, 23D and 24C of the wheel housing upper member 2 and the lower flange sections 6D and 7D of the wheel housing lower member 3 are formed from the lateral flanges over the entire length. In this way, even when the orientation on the upper flange section side varies in terms of the longitudinal direction (when both the upper flange and the lateral flange are provided as in the embodiment), the outer panel can be easily lapped over and attached to the inner panel from the outside in the vehicle widthwise direction, and a hollow cross-sectional portion can be defined continuously inside the lateral-section frame 1.

Next, operations of the stiffener 18 will be explained. In the upper curved section 4, the connecting section 13C of the stiffener 18 is attached to the inside surface section 7B in such a way as not to interfere with the inside ridge 12A. Accordingly, the connecting section 18C is easily deformed by receiving a shear load. Thus, a front side lower member 3 can be stably bent at the location where the connecting section 18C is disposed while securing the rigidity of the front side lower member 3 with the stiffener 18. For this reason, it is not necessary to extend the front rigid section 18A and the rear rigid section 13B forward and rearward merely for the purpose of creating a difference in strength distribution from that at each bending point. Thus, the stiffener 18 can be reduced in size and weight.

In the meantime, the recess 19 is formed on the inside ridge 12A and the stiffener 18 is provided with the cutout 18D in such a way as to surround the recess 19. In other words, the stiffener 18 is disposed around the recess 19. Accordingly, the recess 19 and the cutout 18D collectively constitute the fragile section, whereby the upper curved section 4 is bent more stably without causing concentration of the stress on a point in front of or in the rear of the upper curved section 4.

The difference in strength from the cross-sectional portion of the wheel housing lower member 3 where the connecting section 18C is located is enhanced by disposing the bulkhead 25 at the front rigid section 18A of the stiffener 18. Thus, it is possible to bend the front side lower member 3 more stably at the location where the connecting section 18C is disposed. When the fender support bracket 26 is located at the upper surface section 6A of the wheel housing lower member 3 above the bulkhead 25, it is possible to increase attachment rigidity of the fender support bracket 26 to the wheel housing lower member 3.

Next, operations of the front side frame 31 will be explained. In case of the front collision, the front part of the front side frame 31 is bent inward in the vehicle widthwise direction (in a direction of an arrow P in FIG. 3) into a V-shape while using each reduced-width section 34 as the bending point. As a consequence, it is possible to create a deformation behavior of the front part of the lateral-section frame 1 that is bent into the Z-shape in the vertical direction and a deformation behavior of the front part of the front side frame 31 that is bent, inward in the vehicle widthwise direction into the V-shape without causing interference with each other. Thus, the amount of impact energy absorption can be secured.

The preferred embodiment of the present invention has been described above. At the lower curved section 5 in the embodiment, the dent 13 is formed on the inside ridge 11 that is formed by the upper surface (the upper surface section 6A) and the outside surface (the outside surface section 6B) while the elongated hole 15 is formed in the outside surface. Instead, depending on changes in the flange sections of the outer panel 6 and the inner panel 7 and the like, the dent 13 may be formed on the inside ridge that is formed by the upper surface and the inside surface while the elongated hole 15 may be formed in the inside surface. Alternatively, the dents 13 may be formed on both of the inside ridges while the elongated holes 15 may be formed in the outside surface and the inside surface, respectively.

REFERENCE SIGNS LIST 1 lateral-section frame
2 wheel housing upper member
3 wheel housing lower member
4 upper curved section
5 lower curved section
6 outer panel
6C upper flange section (upward flange)
6C' upper flange section (lateral flange)
6D lower flange section (lateral flange)
7 inner panel
7C upper flange section (upward flange)
7C' upper flange section (lateral flange)
7D lower flange section (lateral flange)
8 rectangular closed cross-sectional portion
9 inside curved surface
10 outside curved surface
11 inside ridge (of lower curved section)
11A outside ridge (of upper curved section)
12 outside ridge (of lower curved section)
12A inside ridge (of upper curved section)
13 dent
15 elongated hole
16 through-hole
17 notch
18 stiffener (reinforcement member)
19 recess
20 outer panel
20C upper flange section (upward flange)
20D lower flange section (lateral flange)
21 first inner panel
21A upper flange (upward flange)
22 second inner panel
23 third inner panel
23D lower flange (upward flange)
24 fourth inner panel
24C lower flange section (lateral flange)
31 front side frame
35 gusset

The invention claimed is:

1. A vehicle chassis front section structure comprising:
a lateral-section frame disposed on an outside in a vehicle widthwise direction of a front side frame, the lateral-section frame including
a wheel housing upper member with a rear end connected to a front pillar, and
a wheel housing lower member extending forward and downward from the wheel housing upper member via an upper curved section and a lower curved section of the wheel housing lower member with a front end of the wheel housing lower member located substantially at the same position in terms of a vertical direction and a longitudinal direction as a front end of the front side frame, wherein each of the wheel housing upper member and the wheel housing lower member includes an outer panel and an inner panel to be joined to each other by using upper flange sections and lower flange sections provided to the panels, respectively, such that the wheel housing upper and lower members define a continuous hollow cross-section, and each upper flange section at a front part of the wheel housing lower member is formed from an upward flange that extends upward, wherein a stiffener that extends forward and rearward across the upper curved section is attached to an interior of the wheel housing lower member, and a fragile section is formed on an inside ridge of the upper curved section and configured to induce deformation of the upper curved section in case of input of a collision load, and wherein a fragile section is formed on an inside ridge of the lower curved section of the wheel housing lower member and configured to induce deformation of the lower curved section in case of input of a collision load.

2. The vehicle chassis front section structure according to claim 1, wherein
a portion at a rear of the upper curved section of the wheel housing lower member is located lateral to a damper base, and
each upper flange section of the portion at the rear of the upper curved section of the wheel housing lower member is formed from a lateral flange that extends horizontally.

3. The vehicle chassis front section structure according to claim 2, wherein
a front end of the lateral-section frame and the front end of the front side frame are connected to each other by using a gusset, and
a front part of the lateral-section frame is bent substantially into a Z-shape while using the upper curved section and the lower curved section as bending points and a front part of the front side frame is bent inward in the vehicle widthwise direction substantially into a V-shape in response to a front collision load.

4. The vehicle chassis front section structure according to claim 1, wherein each upper flange section of the wheel housing upper member is formed from an upward flange that extends upward, and wherein
the upward flanges of the upper flange sections of the wheel housing upper member are offset outward in the vehicle width direction from the upward flange of the upper flange sections at the front part of the wheel housing lower member, and is bent such that a front part of the upward flanges of the upper flange sections of the wheel housing upper member is displaced inward in the vehicle widthwise direction relative to a rear part of the upper flanges of the upper flange sections of the wheel housing upper member.

5. The vehicle chassis front section structure according to claim 4, wherein
a front end of the lateral-section frame and the front end of the front side frame are connected to each other by using a gusset, and
a front part of the lateral-section frame is bent substantially into a Z-shape while using the upper curved section and the lower curved section as bending points and a front part of the front side frame is bent inward in the vehicle widthwise direction substantially into a V-shape in response to a front collision load.

6. The vehicle chassis front section structure according to claim 1, wherein each lower flange section of each of the wheel housing upper member and the wheel housing lower member is formed from a lateral flange that extends horizontally.

7. The vehicle chassis front section structure according to claim 6, wherein
- a front end of the lateral-section frame and the front end of the front side frame are connected to each other by using a gusset, and
- a front part of the lateral-section frame is bent substantially into a Z-shape while using the upper curved section and the lower curved section as bending points and a front part of the front side frame is bent inward in the vehicle widthwise direction substantially into a V-shape in response to a front collision load.

8. The vehicle chassis front section structure according to claim 1, wherein
- a front end of the lateral-section frame and the front end of the front side frame are connected to each other by using a gusset, and
- a front part of the lateral-section frame is bent substantially into a Z-shape while using the upper curved section and the lower curved section as bending points and a front part of the front side frame is bent inward in the vehicle widthwise direction substantially into a V-shape in response to a front collision load.

\* \* \* \* \*